United States Patent
Hendrick

(10) Patent No.: US 12,050,956 B1
(45) Date of Patent: Jul. 30, 2024

(54) SMART CARD READER

(71) Applicant: Chaya Coleena Hendrick, Henderson, NV (US)

(72) Inventor: Chaya Coleena Hendrick, Henderson, NV (US)

( * ) Notice: Subject to any disclaimer, the term of this patent is extended or adjusted under 35 U.S.C. 154(b) by 0 days.

(21) Appl. No.: 18/131,338

(22) Filed: Apr. 5, 2023

(51) Int. Cl.
 *G06K 7/00* (2006.01)

(52) U.S. Cl.
 CPC .......... *G06K 7/006* (2013.01); *G06K 7/0052* (2013.01); *G06K 7/0065* (2013.01)

(58) Field of Classification Search
 CPC ..... G06K 7/006; G06K 7/0052; G06K 7/0065
 See application file for complete search history.

(56) References Cited

U.S. PATENT DOCUMENTS

| | | | | |
|---|---|---|---|---|
| 6,021,948 A * | 2/2000 | Tsai | ...................... | G06K 7/0004 235/440 |
| 9,916,529 B1 * | 3/2018 | Lee | ........................ | G06K 19/14 |
| 2008/0237237 A1 * | 10/2008 | Watson | ................ | H05K 5/0278 220/375 |
| 2009/0289117 A1 * | 11/2009 | Lu | ........................ | G06K 7/0004 235/440 |
| 2014/0001263 A1 * | 1/2014 | Babu | ................. | H04W 52/0229 235/440 |
| 2015/0076230 A1 * | 3/2015 | Woolf | .................. | G06K 7/0026 235/440 |
| 2015/0103018 A1 * | 4/2015 | Kamin-Lyndgaard | ...................... | G06F 3/0443 345/173 |
| 2015/0201723 A1 * | 7/2015 | Rayner | .................. | F16M 13/04 224/191 |
| 2016/0012445 A1 * | 1/2016 | Villa-Real | .......... | G06Q 20/4016 705/44 |
| 2017/0308889 A1 * | 10/2017 | Cameron | ............. | G06Q 20/352 |
| 2019/0114612 A1 * | 4/2019 | Gerlach | ............... | G06Q 20/204 |
| 2022/0383315 A1 * | 12/2022 | Eisen | ................... | G06K 7/1095 |

* cited by examiner

*Primary Examiner* — Tuyen K Vo
(74) *Attorney, Agent, or Firm* — QuickPatents; Kevin Prince

(57) ABSTRACT

A device for reading information from a smart card of the type having a contact chip and/or a magnetic stripe. An enclosure has a top surface, a bottom surface, and at least one peripheral edge, all of which together define an enclosure internal volume therewithin. A control circuit is disposed at least partially within the enclosure internal volume and includes at least a processor, a memory, a power source, a magnetic stripe reader, a contact chip reader, a fingerprint sensor, a display screen, an LED indicator, an NFC/RFID reader, a wireless module, and optionally an interface connector. As such, information from the smart card is stored by the processor into the memory when the smart card is either swiped through a first slot or inserted into a second slot and transferred to an electronic device connected with the interface connector or wirelessly.

20 Claims, 3 Drawing Sheets

SMART CARD READER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to smart card readers, and more particularly to a compact smart card reader with biometric security features.

BACKGROUND

Regular electronic card readers are notoriously bulky and some require wired connections to power outlets, phone lines, internet lines, or the like. Such traditional smart card readers, which herein include electronic card readers, are therefore difficult to transport and use at a remote location. Further, moving such a smart card reader takes preplanned effort, and therefore impromptu transactions when a vendor is out and about are next to impossible with such traditional solutions. Further, such traditional electronic card reading terminals do not always have the means for reading smart cards configured with NFC/RFID capability, contact chips, or the like.

Therefore, there is a need for a device that is highly portable and can be easily carried and used at a whim. Such a needed invention would be compact, lightweight, and would provide security features to ensure only authorized users can utilize the device. Such a needed device would further provide for a number of different smart card types. The present invention accomplishes these objectives.

SUMMARY OF THE INVENTION

The present device is a device for reading information from a smart card of the type having a contact chip, and/or a magnetic stripe, and possibly a battery. Such electronic or smart cards are typically similar in size to credit cards. The device transfers the information from the smart card to an electronic device, such as a smart phone, tablet computer, or the like.

An enclosure has a top surface, a bottom surface, and at least one peripheral edge, all of which together define an enclosure internal volume therewithin. A control circuit is disposed at least partially within the enclosure internal volume and includes at least a processor, a memory, a power source, a magnetic stripe reader and/or a contact chip reader, and an interface connector, such as a USB interface connector, projecting away from the at least one peripheral edge, or a wireless connection through a Bluetooth, RFID, NFC connection between the electronic card, card reader, and a connected device such as a smart phone, laptop computer, or network computing device.

Preferably the control circuit further includes a display screen that traverses the enclosure, either at the top surface or at the bottom surface. The control circuit is configured for displaying information such as payment parameters, smart card information, and instructions on the display screen.

The enclosure includes a first slot for receiving the smart card. The magnetic stripe reader is disposed to read the magnetic stripe of the smart card when the smart card is swiped through the first slot. The enclosure includes a second slot for receiving the smart card. The contact chip reader is disposed to read the contact chip of the smart card when the smart card is inserted into the second slot.

As such, information from the smart card is stored by the processor into the memory when the smart card is either swiped through the first slot or inserted into the second slot. Such information can then be read by an electronic device connected with the interface connector. Alternatively the information from the card is sent directly from the card through the card reading device to another electronic receiving device.

Preferably the control circuit further includes a fingerprint sensor that traverses one or more of the enclosure surfaces. The control circuit is configured for reading fingerprint information from the fingerprint sensor and comparing the fingerprint information with authorized fingerprint information stores in the memory. As such, the control circuit may be placed in a sleep mode until an authorized user has his fingerprint read by the fingerprint sensor, thereby unlocking the control circuit and allowing normal operation thereof for a predetermined period of time, such as one to two minutes.

In some embodiments the control circuit further includes a wireless communication module configured for wirelessly communicating with the electronic device. Such a wireless communication module may utilize Bluetooth, Wi-Fi, or other wireless protocols, for example. As such, the electronic device would not need to be connected via the interface connector to obtain information about the smart card.

Preferably the control circuit further includes a wireless Near-Field Communication (NFC) or Radio Frequency Identifier (RFID) reader for reading smart cards of the type having an NFC/RFID capability.

In some embodiments the control circuit further includes an LED indicator visible from outside of the enclosure. The control circuit is configured for driving the LED indicator to represent different modes of the device. For example, a green LED may indicate that the device is ready to receive the smart card, while a flashing red LED may indicate that the device is in a locked mode.

Preferably a protective cap is configured for selectively securing over the interface connector. Such a cap is preferably tethered to the enclosure with a flexible connector affixed between two connection loops, one of the connection loops being fixed with the cap and another of the connection loops being fixed with the enclosure. Each connection loop may further be sized to receive a key ring fixed therethrough.

The present invention is a device that is highly portable and can be easily carried and used at a whim. The present invention is compact, lightweight, and provides biometric security features to ensure only authorized users can utilize the device. The present device further works with a large number of different smart card types. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
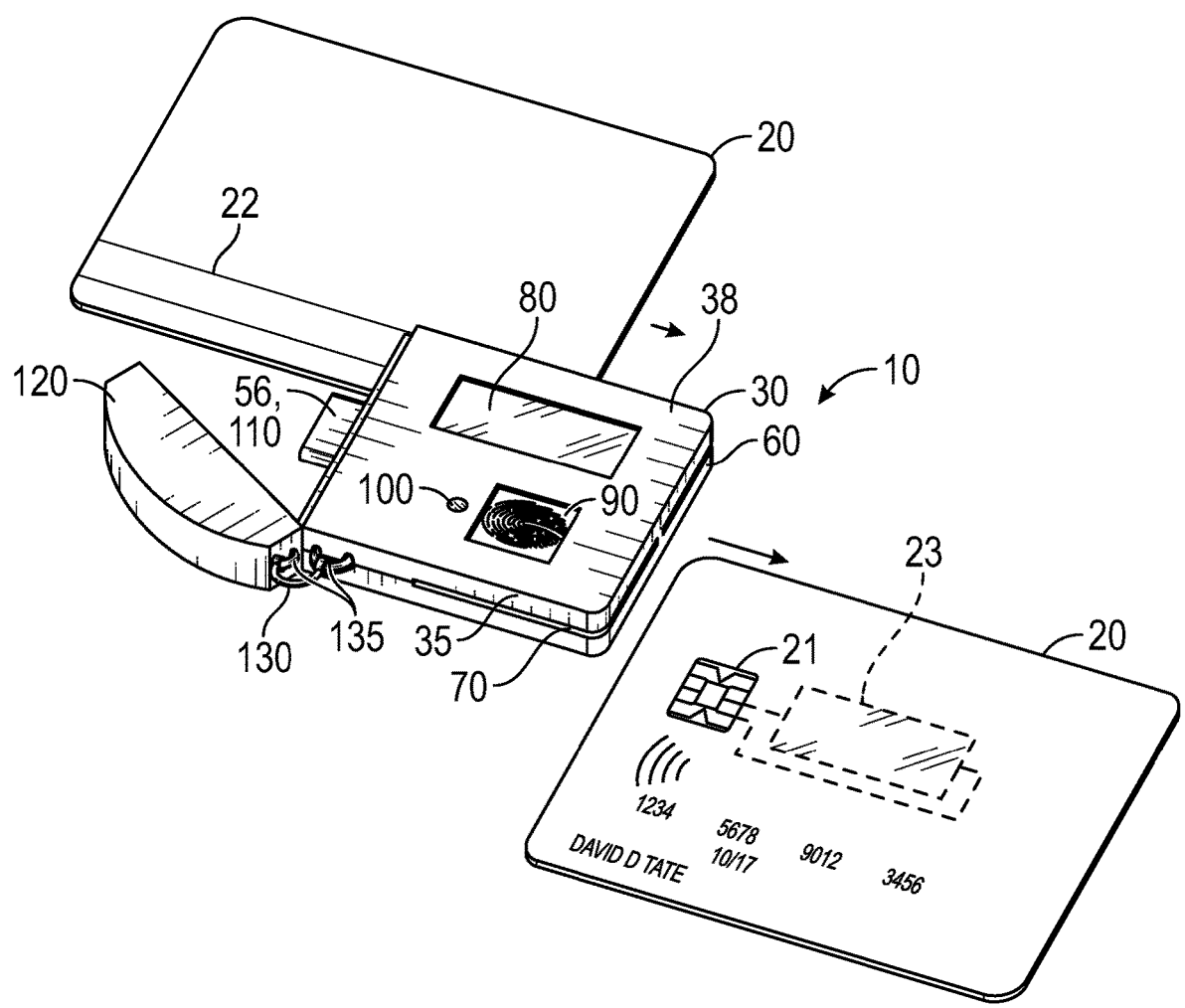
FIG. 1 is a perspective view of one embodiment of the invention, illustrated with two smart cards traversing slots of the device.
Figure 2:
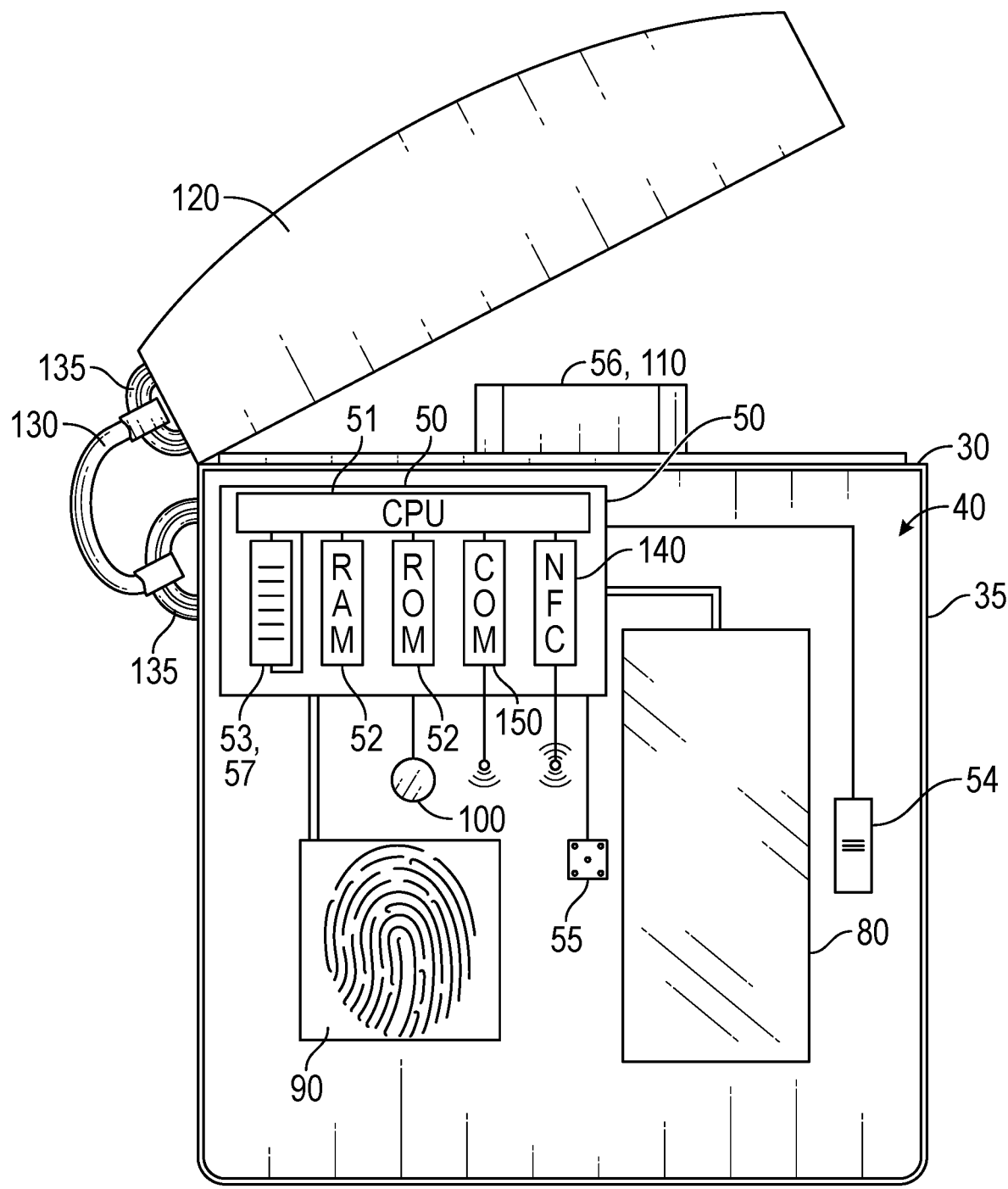
FIG. 2 is a front elevational diagram of the invention, illustrating internal components of a control circuit of the invention.

FIGS. 1-2 illustrate a device 10 for reading information from a smart card 20 of the type having a contact chip 21, a magnetic stripe 22, and possibly a battery 23. The device 10 transfers the information from the smart card 20 to an electronic device (not shown) such as a smart phone, tablet computer, or the like.

An enclosure 30 has a top surface 38, a bottom surface 32, and at least one peripheral edge 35, all of which together define an enclosure internal volume 40 therewithin. Preferably the at least one peripheral edge 35 is four peripheral edges 35, wherein the top surface 38 and the bottom surface 32 are both rectangular in shape, as illustrated. However, other shapes of the device 10 are certainly possible, such as oval, circular, triangular, etc. Preferably the enclosure 30 is made with an injection molded plastic material.

A control circuit 50 is disposed at least partially within the enclosure internal volume 40 and includes at least a processor 51, a memory 52, a power source 53, a magnetic stripe reader 54, a contact chip reader 55, and an interface connector 56, such as a USB interface connector 110, projecting away from the at least one peripheral edge 35. The memory 52 may be a combination of RAM/ROM or other type of computer memory. The power source 53 is preferably a rechargeable battery 57 that is recharged by power delivered through the interface connector 56 from the electronic device (not shown).

Preferably the control circuit 50 further includes a display screen 80 that traverses the enclosure 30, either at the top surface 38 or at the bottom surface 32. The control circuit 50 is configured for displaying information such as payment parameters, smart card information, and instructions on the display screen 80.

The enclosure 30 includes a first slot 60 for receiving the smart card 20. The magnetic stripe reader 54 is disposed to read the magnetic stripe 22 of the smart card 20 when the smart card 20 is swiped through the first slot 60.

The enclosure includes a second slot 70 for receiving the smart card 20. The contact chip reader 55 is disposed to read the contact chip 21 of the smart card 20 when the smart card 20 is inserted into the second slot 70. In some embodiments, the control circuit 50 is configured to deliver power from the power source 53 to a battery 23 of the smart card 20 through the contact chip reader 55 in order to recharge the battery 23 of the smart card 20.

As such, information from the smart card 20 is stored by the processor 51 into the memory 52 when the smart card 20 is either swiped through the first slot 60 or inserted into the second slot 70. Such information can then be read by an electronic device connected with the interface connector 56.

Figure 3:
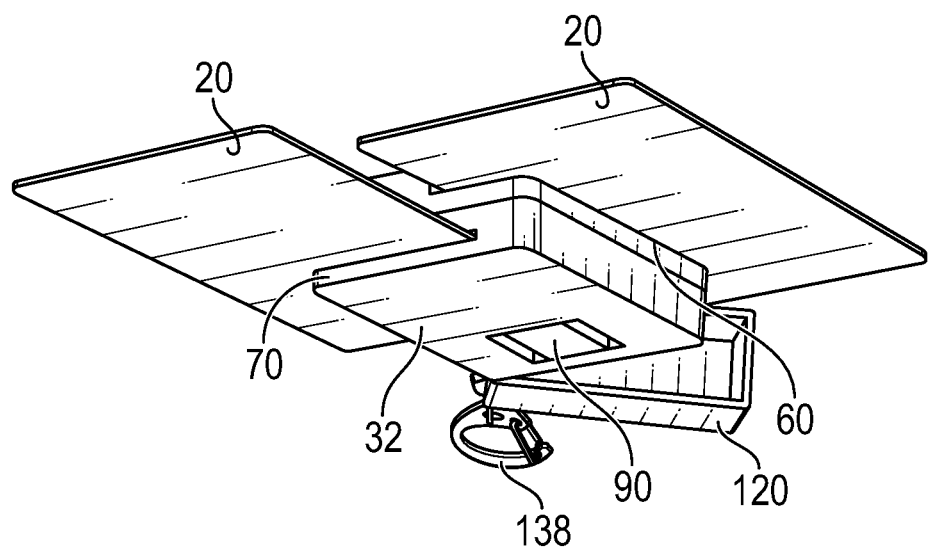
FIG. 3 is a bottom perspective view of an alternate embodiment of the invention.

Preferably the control circuit 50 further includes a fingerprint sensor 90 that traverses the enclosure, either at the top surface 38 (FIGS. 1-2) or at the bottom surface 32 (FIG. 3).

The control circuit 50 is configured for reading fingerprint information from the fingerprint sensor 90 and comparing the fingerprint information with authorized fingerprint information stored in the memory 52. As such, the control circuit 50 may be placed in a sleep mode until an authorized user has his fingerprint read by the fingerprint sensor 90, thereby unlocking the control circuit 50 and allowing normal operation thereof for a predetermined period of time, such as one to two minutes.

In some embodiments the control circuit 50 further includes a wireless communication module 150 configured for wirelessly communicating with the electronic device (not shown). Such a wireless communication module 150 may utilize Bluetooth, Wi-Fi, or other wireless protocols, for example. As such, the electronic device would not need to be connected via the interface connector 56 to obtain information about the smart card 20.

Preferably the control circuit 50 further includes a wireless Near-Field Communication (NFC) or Radio Frequency Identifier (RFID) reader 140 (FIG. 2) for reading smart cards of the type having an NFC/RFID capability.

In some embodiments the control circuit 50 further includes an LED indicator 100 visible from outside of the enclosure 30. The control circuit 50 is configured for driving the LED indicator to represent different modes of the device 10. For example, a green LED may indicate that the device 10 is ready to receive the smart card 20, while a flashing red LED may indicate that the device 10 is in a locked mode.

Preferably a protective cap 120 is configured for selectively securing over the interface connector 56. Such a cap 120 is preferably tethered to the enclosure 30 with a flexible connector 130 affixed between two connection loops 135, one of the connection loops 135 being fixed with the cap 120 and another of the connection loops 135 being fixed with the enclosure 30. Each connection loop 135 may further be sized to receive a key ring 138 fixed therethrough (FIG. 3).

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention is should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for reading information from a smart card of the type having at least a plurality of peripheral edges, an overall length, an overall width, an overall thickness, a contact chip and/or a magnetic stripe, the device comprising:

an enclosure having a top surface, a bottom surface, a first peripheral edge, a second peripheral edge, a third peripheral edge disposed opposite the first peripheral edge, a fourth peripheral edge disposed opposite the second peripheral edge, an overall length, an overall width, and an overall thickness, the top surface, the bottom surface, the first peripheral edge, the second peripheral edge, the third peripheral edge, and the fourth peripheral edge of the enclosure defining an enclosure internal volume therewithin, the overall length of the enclosure being less than the overall length of the smart card, the overall width of the enclosure being less than the overall width of the smart card;

a control circuit disposed at least partially within the enclosure internal volume and including at least a processor, a memory, a power source, a magnetic stripe reader, a contact chip reader, and an interface connector projecting away from the first peripheral edge of the enclosure;

the enclosure further including a first slot traversing the first peripheral edge, the second peripheral edge, and the third peripheral edge of the enclosure, but not traversing the fourth peripheral edge of the enclosure, the first slot for receiving the smart card, the first slot sized to receive no more than two of the plurality of peripheral edges of the smart card simultaneously when the smart card is swiped through the first slot, the magnetic stripe reader disposed to read the magnetic stripe of the smart card when the smart card is swiped through the first slot; and the enclosure further including a second slot traversing the third peripheral edge and the fourth peripheral edge of the enclosure, but not traversing the first peripheral edge and the second peripheral edge of the enclosure, the second slot for receiving the smart card, the second slot sized to receive no more than two of the plurality of peripheral edges of the smart card simultaneously when the smart card is inserted into the second slot, the contact chip reader disposed to read the contact chip of the smart card when the smart card is inserted into the second slot;

the first slot and the second slot together traversing at least a majority of the overall width of the enclosure at the third peripheral edge of the enclosure;

whereby information from the smart card is stored by the processor into the memory when the smart card is either swiped through the first slot or inserted into the second slot, and whereby information in the memory is read by an electronic device connected with the interface connector.

2. The device of claim 1 wherein the control circuit further includes a display screen that traverses the enclosure, the control circuit configured for displaying information on the display screen.

3. The device of claim 2 wherein the display screen traverses the top surface of the enclosure.

4. The device of claim 2 wherein the display screen traverses the bottom surface of the enclosure.

5. The device of claim 1 wherein the control circuit further includes a fingerprint sensor that traverses the enclosure, the control circuit configured for reading fingerprint information from the fingerprint sensor and comparing the fingerprint information with authorized fingerprint information stored in the memory.

6. The device of claim 5 wherein the fingerprint sensor traverses the top surface of the enclosure.

7. The device of claim 5 wherein the fingerprint sensor traverses the bottom surface of the enclosure.

8. The device of claim 1 wherein the control circuit further includes an LED indicator visible from outside of the enclosure, the control circuit configured for driving the LED indicator to represent different modes of the device.

9. The device of claim 1 wherein the interface connector is a USB interface connector.

10. The device of claim 1 further comprising a cap configured for selectively securing over the interface connector.

11. The device of claim 10 wherein the cap is tethered to the enclosure with a flexible connector affixed between two connection loops, one of the connection loops fixed with the cap and another of the connection loops fixed with the enclosure.

12. The device of claim 11 wherein each connection loop is sized to receive a key ring fixed therethrough.

13. The device of claim 1 wherein the control circuit further includes a wireless NFC/RFID transceiver for reading smart cards of the type having an NFC/RFID capability.

14. The device of claim 1 wherein the control circuit further includes a wireless communication module configured for communicating with the electronic device.

15. The device of claim 14 wherein the wireless communication module is a Bluetooth wireless communication module.

16. The device of claim 1 wherein the power source includes power delivered through the interface connector from the electronic device.

17. The device of claim 1 wherein the power source includes a battery that is rechargeable by power delivered through the interface connector from the electronic device.

18. The device of claim 1 wherein the control circuit is configured to deliver power from the power source to a battery of the smart card through the contact chip reader for recharging the battery of the smart card.

19. A device for reading information from a smart card of the type having at least a plurality of peripheral edges, a contact chip and/or a magnetic stripe, the device comprising:
    an enclosure having a top surface, a bottom surface, a first peripheral edge, a second peripheral edge, a third peripheral edge disposed opposite the first peripheral edge, a fourth peripheral edge disposed opposite the second peripheral edge, an overall length extending in a longitudinal direction, an overall width extending in a lateral direction, and an overall thickness extending in a vertical direction, the top surface, the bottom surface, the first peripheral edge, the second peripheral edge, the third peripheral edge, and the fourth peripheral edge of the enclosure defining an enclosure internal volume therewithin;
    a control circuit disposed at least partially within the enclosure internal volume and including at least a processor, a memory, a power source, a magnetic stripe reader, a contact chip reader, and an interface connector projecting away from the first peripheral edge of the enclosure;
    the enclosure further including a first slot traversing the first peripheral edge, the second peripheral edge, and the third peripheral edge of the enclosure, but not traversing the fourth peripheral edge of the enclosure, the first slot for receiving the smart card, the first slot sized to receive no more than two of the plurality of peripheral edges of the smart card simultaneously when the smart card is swiped in the longitudinal direction through the first slot, the magnetic stripe reader disposed to read the magnetic stripe of the smart card when the smart card is swiped in the longitudinal direction through the first slot; and
    the enclosure further including a second slot traversing the third peripheral edge and the fourth peripheral edge of the enclosure, but not traversing the first peripheral edge and the second peripheral edge of the enclosure, the second slot for receiving the smart card, the second slot sized to receive no more than two of the plurality of peripheral edges of the smart card simultaneously when the smart card is inserted in the longitudinal direction into the second slot, the contact chip reader disposed to read the contact chip of the smart card when the smart card is inserted in the longitudinal direction into the second slot;
    the first slot and the second slot together traversing at least a majority of the overall width of the enclosure at the third peripheral edge of the enclosure;
    whereby information from the smart card is stored by the processor into the memory when the smart card is either swiped through the first slot or inserted into the second slot, and whereby information in the memory is read by an electronic device connected with the interface connector.

20. A device for reading information from a smart card of the type having a contact chip and/or a magnetic stripe, the device comprising:
    an enclosure having a top surface, a bottom surface, a first peripheral edge, a second peripheral edge, a third peripheral edge disposed opposite the first peripheral edge, a fourth peripheral edge disposed opposite the second peripheral edge, an overall length extending in a longitudinal direction, an overall width extending in a lateral direction, and an overall thickness extending in a vertical direction, the top surface, the bottom surface, the first peripheral edge, the second peripheral edge, the third peripheral edge, and the fourth peripheral edge of the enclosure defining an enclosure internal volume therewithin;
    a control circuit disposed at least partially within the enclosure internal volume and including at least a processor, a memory, a power source, a magnetic stripe reader, a contact chip reader, and an interface connector projecting away from the first peripheral edge of the enclosure;
    the enclosure further including a first slot traversing the first peripheral edge, the second peripheral edge, and the third peripheral edge of the enclosure, but not traversing the fourth peripheral edge of the enclosure, the first slot for receiving the smart card, the magnetic stripe reader disposed to read the magnetic stripe of the smart card when the smart card is swiped in the longitudinal direction through the first slot; and
    the enclosure further including a second slot traversing the third peripheral edge and the fourth peripheral edge of the enclosure, but not traversing the first peripheral edge and the second peripheral edge of the enclosure, the second slot for receiving the smart card, the contact chip reader disposed to read the contact chip of the smart card when the smart card is inserted in the longitudinal direction into the second slot;
    the first slot and the second slot together traversing at least a majority of the overall width of the enclosure at the third peripheral edge of the enclosure;
    the first slot and the second slot are spaced apart at the third peripheral edge of the enclosure by a distance that is less than the overall thickness of the enclosure;
    whereby information from the smart card is stored by the processor into the memory when the smart card is either swiped through the first slot or inserted into the second slot, and whereby information in the memory is read by an electronic device connected with the interface connector.

\* \* \* \* \*